May 21, 1968  C. WERMUTH ET AL  3,384,363
FIXING MECHANISM
Filed Sept. 21, 1964  3 Sheets-Sheet 1
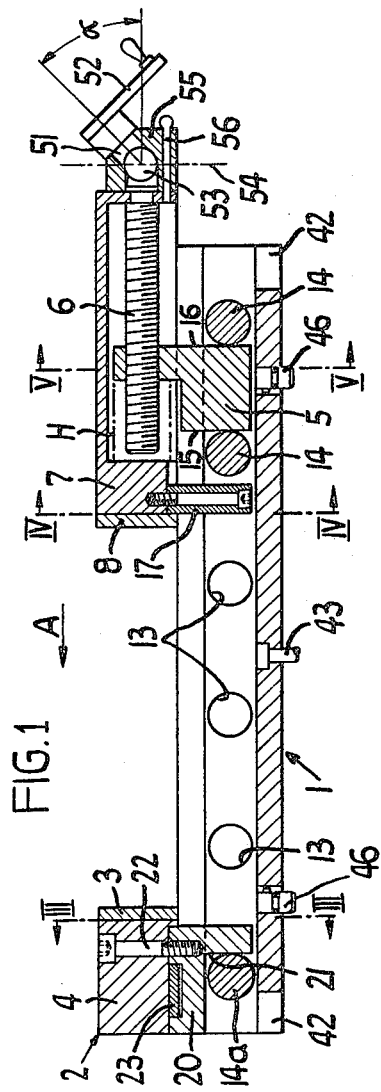
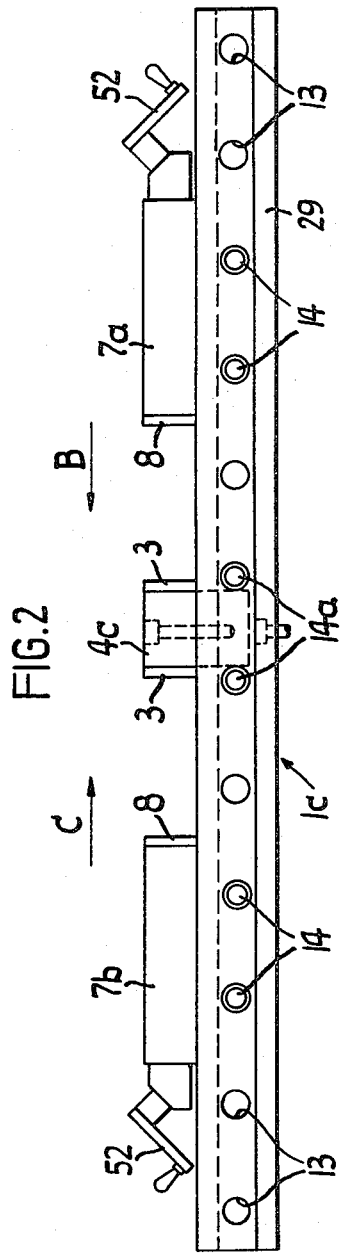
INVENTORS
CHARLES WERMUTH
HEINZ WAGNER
FRANZ ARNOLD
BY
Woodhams, Blanchard & Flynn
ATTORNEYS

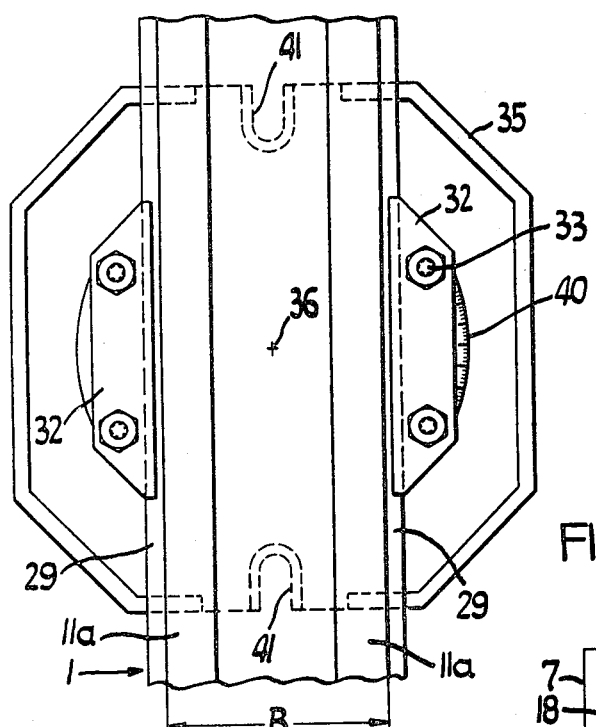
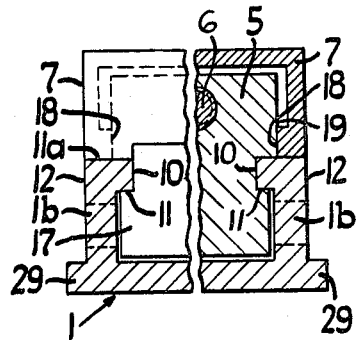
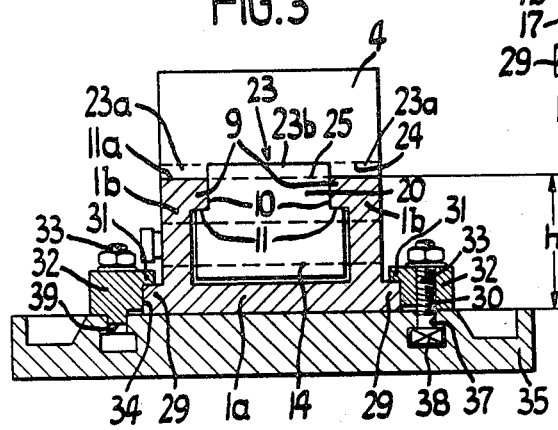

May 21, 1968   C. WERMUTH ET AL   3,384,363
FIXING MECHANISM
Filed Sept. 21, 1964   3 Sheets-Sheet 3
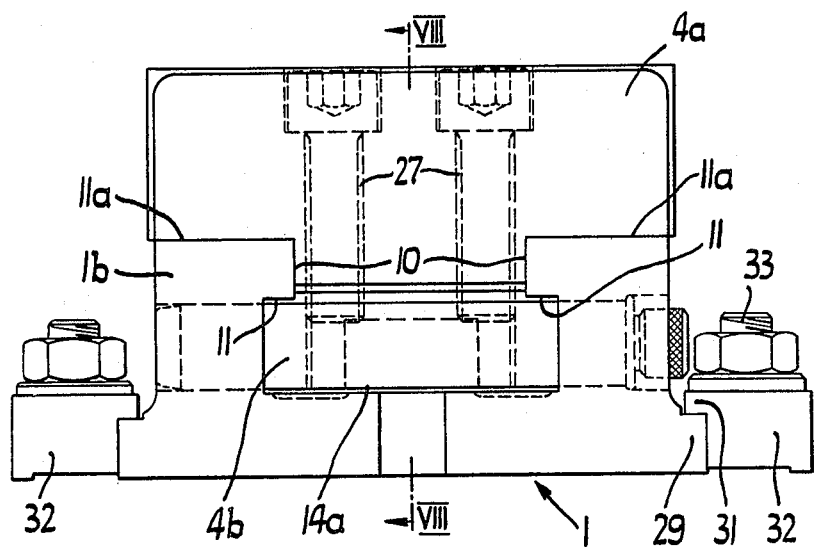
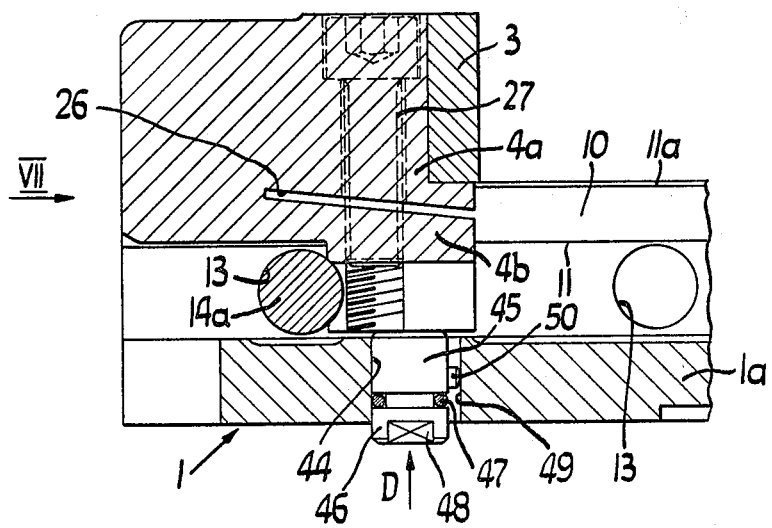
INVENTORS
CHARLES WERMUTH
HEINZ WAGNER
FRANZ ARNOLD
BY Woodhams, Blanchard and Flynn
ATTORNEYS

United States Patent Office 3,384,363
Patented May 21, 1968

3,384,363
FIXING MECHANISM
Charles Wermuth, Wangi, and Heinz Wagner, Aadorf, Switzerland, and Franz Arnold, Spatzenweg 48, Kempten, Germany; said Wermuth and said Wagner assignors to said Arnold
Filed Sept. 21, 1964, Ser. No. 397,806
Claims priority, application Switzerland, Sept. 24, 1963, 11,770/63
8 Claims. (Cl. 269—146)

This invention relates to mechanical fixing mechanism, in particular a machine tool vice, comprising a base plate of U profile in cross section in which a nut for a spindle is guided laterally and which is adapted to be fixed by means of bolts, for which purpose a series of horizontal transverse holes are provided in the limbs of the base plate.

In a known vice of this construction the spindle nut is guided between the limbs of the U via internal guide surfaces extending over the whole height of the limbs, the upper part of the U forming a further guide surface for this nut. In order to guide the slide carrying one of the jaws the limbs of the U have horizontal outwardly directed guide strips embraced by the slide. This construction, in which the spindle nut is fixed in the base plate by means of a transverse bolt extending through it, has serious disadvantages both as regards manufacture and operation. The inner guide surfaces for the spindle nut and also the outer guide surfaces for the slide must be worked. Since, moreover, the width of the slide is appreciably greater than the spacing of the outer limb guiding surfaces, the surface of application of the work piece to the base plate is relatively narrow. This known construction is also of relatively great overall height. It also has the disadvantage that shavings can reach the guide surfaces of the spindle nut and thus impair the guiding and also the displacement of the nut.

The object of the present invention is to avoid the above-mentioned disadvantages and to provide mechanical fixing mechanism, in particular a machine vice, in which the guiding means for the nut and the slide are simplified viz. common guide elements are provided on the base plate for the nut and the slide, and in which the height of the vice is reduced as compared with known constructions, and in which a wide and stable abutment is provided for the work piece.

A further object of the invention is to provide fixing mechanism in which not only can the fixing width be varied but the work piece can be fixed at any place along the base plate.

In mechanical fixing mechanism according to the invention the two vertical limbs of the base plate have only inwardly directed guide strips each having an inner vertical guide surface and a lower horizontal guide surface, by which the spindle nut and also the slide carrying the movable jaws are guided, having a width equal to the spacing of the outer ends of the limbs, two bolts extending through adjacent transverse holes being provided for fixing the nut, and the lower part of the nut being of such dimensions that its front face bears on one bolt and its rear face on the other bolt.

This new construction has the advantage that there are provided for guiding the spindle nut and the slide common inwardly directed guide surfaces which are not impaired by shavings or the like. Due to the arrangement of the guide strips the base plate may be of relatively small height and a wide abutment surface is provided for the work piece since the width of the jaws or slide is the same as the width of the abutment plate.

Further features and advantages of the invention will now be explained with reference to the accompanying drawings, in which FIG. 1 is a longitudinal section of a pressure operated vice,
FIG. 2 is a side view of a particular form of such a vice,
FIG. 3 is a cross-sectional view taken on the line III—III of FIG. 1,
FIG. 4 is a fragmentary sectional view taken on the line IV—IV of FIG. 1,
FIG. 5 is a fragmentary sectional view taken on the line V—V of FIG. 1,
FIG. 6 is a plan view of the parts shown in FIG. 3,
FIG. 7 is an end view of another construction of vice, looking in the direction VII of FIG. 8, and
FIG. 8 is a partial longitudinal section on the line VIII—VIII of FIG. 7.

Referring to FIGS. 1 to 5, 1 is the base plate of a machne vice, 4 is a stationary jaw head carrying a jaw 3, 5 is the spindle nut, 6 is the spindle that can screw in this nut, and 7 is a slide carrying the jaw 8. The base plate 1 is of U section, with a horizontal part 1a and two vertical limbs 1b. On these limbs are provided inwardly directed horizontal guide strips 9, each of which has an inner vertical guide surface 10 and a lower horizontal guide surface 11. As can be seen from the drawing, the nut 5 and the slide 7 are both guided by these surfaces. The drawing also shows that the slide is of a width equal to the spacing of the outer sides 12 of the limbs of the U. The nut 5 is adjustable to enable the fixing width to be varied. For this purpose equally spaced transverse holes 13 are provided in the limbs 1b of the base plate, and two transverse bolts 14 are inserted into two adjacent transverse holes. As can be seen from FIG. 1, the lower part of the nut 5 is of such dimensions that its front face 15 (seen in the fixing direction A) bears on one of the bolts and its rear face 16 bears on the other bolt 14.

As shown in FIG. 1, the slide 7 has at its front part only a guide piece 17 arranged between the limbs 1b of the U, this guide piece 17 serving to guide the slide via the vertical and horizontal guides surfaces 10 and 11 of the limbs of the U. Further, as shown in FIG. 5 there are provided on the slide 7 inner vertical and lateral guide surfaces 18 by which the slide is guided along the side surfaces 19 of the nut 5. In this way, the nut 5 and the slide 7 are mounted and guided satisfactorily without being affected by any forces and torques arising. Shavings that enter the U profile of the base plate fall on to the part 1a, so that they cannot impair the guides 10 and 11. It will also be seen from the drawing that the base plate is of low height h, so that it requires little space on the machine table in the vertical sense, and at the same time the mounting and fixing of the work piece are stable, as is of great advantage for accurate working of the work piece and also as regards the life of the tool used for working.

It will further be seen from the drawing that the jaw head 4 carrying the stationary jaw 3 is guided by the vertical and horizontal inner guide surfaces 10 and 11 of the limbs of the U, and for this purpose the head 4 has a guide piece 20 arranged between the limbs 1b. As shown in FIGS. 1 and 2, the limbs 1b are also provided, over the whole length of the base plate, with transverse holes 13, and for fixing the head 4 at the required place on the base plate a bolt 14a is provided which can be inserted into a transverse hole 13 and which serves as an abutment for the front surface 21 of the guide piece 20. Due to this construction it is possible not only to adjust the fixing width of the vice as desired by means of the two bolts 14 by shifting the nut 5, but also to select the most suitable point of fixing of the work piece along the base plate by suitable adjustment and fixing of the head 4 and the nut 5.

In FIGS. 1 and 3 the jaw head 4 and guide piece 20 are interconnected by vertical screws 22. Between the head 4 and the guide piece 20 is arranged a spring 23 of rectangular section, the two ends 23a (FIG. 3) of which are located in a groove 24 in the head 4, whereas its central part 23 is arranged in a corresponding groove 25 in the guide piece 20. In this way there is obtained an interconnection between the two parts 4 and 20 such as to take up all forces and torques.

A simpler construction of the jaw head is shown in FIGS. 7 and 8. In these figures, the jaw head and guide piece are made in one piece, with an approximately horizontal transverse slot 26 and a vertical fixing screw 27, the arrangement being such that the parts 4a and 4b formed by the slot 26 are stressed relatively to one another by the screw 27 and hence relative to the horizontal guide surfaces 11 and the upper abutment surfaces 11a of the limbs 1b.

Due to the box-like construction of the vice as above described, any desired arrangement of the slide 7 and jaw head 4 on the base plate 1 is possible. Thus, for fixing two work pieces (simultaneously or one after the other) a vice according to FIG. 2 may be used in which there are provided on a base plate 1c of longer length two spindle nuts and associated slides 7a, 7b the fixing directions B and C of which are opposite, there being arranged between these slides and on the base plate 1c two jaw heads 4 according to FIG. 1, or preferably a double sided jaw head 4c, as shown in FIG. 2, held by two transverse bolts 14a and carrying two jaws 3.

Since the above described base plate 1 is of relatively low height h (FIG. 3) in order to prevent bending of this U profile it is necessary to fix this base plate in a suitable manner at the most suitable places. In order to fix the base plate in this way on a support, the lower part of the base plate 1 has outwardly projecting fixing strips 29 on both sides, these strips extending along the whole length of the base plate, and rails 32 provided with vertical holes 30 and with clamping strips 31 are provided, the strips 31 engaging over the fixing strips 29 and being secured to a support 35 by means of bolts 33. The vertical surfaces 34 of the clamping rails 32 abut the vertical surfaces of the fixing strips 29 and hence serve to guide and orientate the base plate 1. Due to this arrangement of the clamping rails 32 not only is it possible to fix the base plate at the most suitable place for preventing bending thereof, but after release of the bolts 33 it is possible to move the clamping rails 32 and/or the base plate 1 longitudinally on the machine table.

The base plate 1 may be directly secured to a machine table with the aid of such clamping rails 32. In the embodiment shown in FIGS. 3 and 6 however there is provided, as a support for the base plate 1, a mounting plate 35 which can be fixed to a machine table and on which the base plate 1 is rotatable about the central axis 36 of the mounting plate. For this purpose the mounting plate 35 is formed with arcuate grooves 37 of T section in which the heads 38 of the bolts 33 are movable. The clamping rails 32 are provided on their undersides with arcuate guide strips 39 which engage in the grooves 37 of the mounting plate 35. When the bolts 33 are released, the base plate 1 can be shifted longitudinally and also rotated about the vertical axis 36 relative to the mounting plate 35, the required angular setting of the base plate being determined by reference to a scale 40. For the purpose of fixing the mounting plate 35 it is provided, as shown in FIG. 6, with slots 41 for the reception of bolts.

For the purpose of fixing the base plate 1 on a machine table it is provided at its ends with suitable longitudinal slots 42 for the reception of bolts. In order to prevent any bending at the centre that might result from the reduced height h, there is advantageously provided at the centre of the part 1a at least one hole 43 for the reception of a bolt for fixing the base plate.

To enable the base plate 1 to be adjusted in the longitudinal direction of a machine table it has previously been necessary to screw to the underside of the base plate or the part 1a members that fit into the longitudinal grooves in the table, these members however needing to be unscrewed again when the base plate is to be arranged transversely on the machine table. In order to avoid this, as shown in FIGS. 1 and 8 a hole 44 is formed near each end of the part 1a for the reception of a centering pin 45 which has a jamming action and is axially movable. The ends 46 of these centering pins project beneath the base plate 1 and engage in the longitudinal slots in the machine table. The required jamming action may be obtained by means of a resilient, outwardly expanding ring 47 of circular section located in an annular groove in the pin 45, the ring 47 thus engaging the wall of the opening 44 for holding the pin 45 in the desired axial position. When the base plate is to be mounted transversely on the machine table the centering pin can easily be pressed inwardly into the part 1a in the direction D.

Advantageously, each centering pin is provided at least at one end with parallel opposed surfaces 48 via which the pin engages in the longitudinal grooves in the table, the table preferably having grooves therein similar to the grooves 37 illustrated in FIG. 3. If these surfaces 48 are provided at both ends of the pin and at different distances apart, one and the same pin may be used for adjusting the base plate in machine tables that have longitudinal grooves of different widths. In order, in the embodiment shown, to prevent rotation of the centering pin upon axial displacement there is provided in the part 1a an axial groove 49 in which engages a nose 50 on the pin 45.

Since in view of the reduced height of the vice the crank for driving the spindle 6 would, with a normal arrangement, be obstructed by the machine table, as shown in FIGS. 1 and 2 the spindle 6 is drivably connected to the crank 52 via an out-of-line drive comprising a driving shaft 51 on which the crank 52 can be placed and which is inclined at an acute angle α, for example 45° to the spindle axis.

In this connection it is advantageous for the driving shaft 51, which is drivably connected to the spindle 6 via a balljoint 53, for example, to be arranged so that it can be swung with the drive housing 55 out of the central position shown through 90° about a vertical axis 54 to one side or the other. In this case a stop pin 56 may be provided for fixing the housing 55 in the required position relative to the slide 7. Since high fixing pressures are as a rule required in machine vices, the vice shown by way of example in the drawings is constructed as a high pressure vice. For this purpose, as shown in FIG. 1 there is arranged between the spindle 6 and the slide 7 a high pressure, e.g. hydraulic, system indicated at H by dot-dash lines. This high pressure system enables the fixing pressure obtainable with the spindle alone to be amplified many times. One form of hydraulic high pressure system which could be utilized with the vice of the present invention is illustrated in U.S. Patent No. 3,147,002.

We claim:

1. Mechanical fixing mechanism comprising a screw-threaded spindle, a spindle nut having a front and a back, and a movable slide, for carrying a fixing jaw drivably connected to said spindle, an elongated base plate of U-section with at least two longitudinally spaced holes in the limbs of the U, each hole in one limb being opposite a corresponding hole in the other limb, inwardly projecting guide strips on said limbs, each said strip having an inner vertical guide surface and a lower horizontal guide surface, said nut and said slide being located for being guided by said guide surfaces and the width of said nut in the longitudinal direction of said base plate being such with two pins extending across said base plate and engaged in adjacent pairs of opposed holes the front and back of said nut are in contact with the respective pins.

2. Mechanical fixing mechanism according to claim 1, including a guide member, on the front of said slide, located between the said limbs, said guide member cooperating with said vertical and horizontal guide surfaces to guide said slide relative to said base plate, said slide having vertical lateral guide surfaces in guided relationship with the sides of said nut.

3. Mechanical fixing mechanism according to claim 1, including a head for carrying a stationary fixing jaw, a guide member on said head located between said limbs in guided relationship with said vertical and horizontal surfaces, said limbs having at least one pair of opposed holes, one in each limb, for the reception of a pin arranged transversely across said base plate and serving as an abutment for the front of said guide member.

4. Mechanical fixing mechanism according to claim 1, including a head for carrying a stationary jaw, a guide member located between said limbs in guided relationship with said vertical and horizontal surfaces, a bolt interconnecting said head and said guide member, and a flat spring located between said head and said guide member, with the ends of said spring located in a groove in said head and the central part of said spring located in a groove in said guide member.

5. Mechanical fixing mechanism according to claim 1, including a head for carrying a stationary jaw, a guide member formed integrally with said head and located between said limbs in guided relationship with said vertical and horizontal guide surfaces, said head being formed with an approximately horizontal slot, and a bolt interconnecting the parts of said head separated by said slot.

6. Mechanical fixing mechanism according to claim 1, including a driving shaft for said spindle arranged at an acute angle to the axis of said spindle, said shaft being mounted for swinging about a vertical axis through 90° to both sides of a central position.

7. Mechanical fixing mechanism according to claim 1, wherein said base plate has a hole in each end of the part interconnecting said limbs, and centering means including a centering pin located in each of said holes, said pin being axially movable and including means for coacting between said interconnecting part and said pin for holding said pin in a desired axial position, one end of said pin being adapted to be received within grooves formed in a mounting member.

8. Mechanical fixing mechanism according to claim 1, wherein said base plate has a hole in each end of the part interconnecting said limbs, centering pins received in and extending through said holes, and means securing said pins against rotation in said interconnecting part, one end of said pins having opposed, substantially parallel surfaces thereon adapted to be received in and engage a groove formed in a mounting member.

References Cited
UNITED STATES PATENTS

| | | | |
|---|---|---|---|
| 728,450 | 5/1903 | Everett | 269—43 X |
| 1,499,989 | 7/1924 | Lehmann | 269—101 |
| 2,565,999 | 8/1951 | Teglas | 269—85 X |
| 2,764,380 | 9/1956 | Gumphrey | 269—84 X |
| 2,987,972 | 6/1961 | Schneider | 269—146 X |

FOREIGN PATENTS 6,555  1913  Great Britain.

ROBERT C. RIORDON, *Primary Examiner.*

J. F. McKEOWN, *Assistant Examiner.*